United States Patent
Atsumi et al.

(10) Patent No.: US 7,394,609 B2
(45) Date of Patent: Jul. 1, 2008

(54) MAGNETIC DISK DRIVE WITH POSITIONING ACCURACY

(75) Inventors: Takenori Atsumi, Ibaraki (JP); Atsushi Okuyama, Kanagawa (JP)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 42 days.

(21) Appl. No.: 11/347,358

(22) Filed: Feb. 3, 2006

(65) Prior Publication Data

US 2006/0176604 A1   Aug. 10, 2006

(30) Foreign Application Priority Data

Feb. 8, 2005   (JP) ............................. 2005-031547

(51) Int. Cl.
*G11B 21/02* (2006.01)
(52) U.S. Cl. ......................................................... 360/75
(58) Field of Classification Search ................... None
See application file for complete search history.

(56) References Cited

U.S. PATENT DOCUMENTS

| | | | | |
|---|---|---|---|---|
| 6,204,988 B1 * | 3/2001 | Codilian et al. | ............... | 360/75 |
| 6,529,344 B1 * | 3/2003 | Kagami et al. | ........... | 360/77.08 |
| 6,643,080 B1 * | 11/2003 | Goodner et al. | ............... | 360/31 |
| 6,927,934 B2 | 8/2005 | Atsumi | | |

FOREIGN PATENT DOCUMENTS

| | | |
|---|---|---|
| JP | 05-298842 | 11/1993 |
| JP | 2002-352534 | 12/2002 |

* cited by examiner

*Primary Examiner*—K. Wong
(74) *Attorney, Agent, or Firm*—Townsend and Townsend and Crew LLP; Patrick Duncan

(57) ABSTRACT

In one embodiment, the magnetic disk drive has a magnetic head, an actuator driving the magnetic head, and a control portion controlling a controlled object, including the magnetic head and the actuator, by creating a control signal based on a given target position signal and on a position signal played back by the magnetic head such that the magnetic head reaches a target position. The control portion is so configured that the phase of the open-loop transfer characteristic at the frequency of the resonant characteristics is arctangent (($R_{op}$+1)/$I_{op}$) when (a) the resonant characteristics are present at frequencies other than the mechanical resonant frequency of the controlled object in the open-loop transfer characteristics when the control portion and the controlled object are connected, (b) the frequency of the resonant characteristics is higher than the frequency at which the gain characteristic of the open-loop transfer characteristics becomes 0 dB, and (c) the coordinates of a vector locus of the open-loop transfer characteristic at the frequency of the resonant characteristic are given by ($R_{op}$, $I_{op}$).

11 Claims, 10 Drawing Sheets

MAGNETIC DISK DRIVE WITH POSITIONING ACCURACY

CROSS-REFERENCES TO RELATED APPLICATIONS

This application claims priority from Japanese Patent Application No. JP2005-031547, filed Feb. 8, 2005, the entire disclosure of which is incorporated herein by reference.

BACKGROUND OF THE INVENTION

The present invention relates to a magnetic disk drive and is especially adapted for a magnetic disk drive fitted with a control portion for providing control to place an object to be controlled including a magnetic head in position.

In a magnetic disk drive, a magnetic head follows a track of interest on a surface of a rotating magnetic disk to record (write) and play back (read out) data. In such a magnetic disk drive, the magnetic disk that is a recording medium is fixed to the rotating shaft of a spindle motor. The magnetic disk is driven by the spindle motor and rotates at a determined rotational frequency. Furthermore, a pivot bearing is mounted radially outside the magnetic disk held to the rotating shaft of the spindle motor and parallel to the shaft of the spindle motor. The magnetic head is fixed to the front end of a carriage which is swingably mounted to the pivot bearing. The carriage is driven by a voice coil motor (VCM) and swings about the pivot bearing. That is, the magnetic head is moved radially over the surface of the magnetic disk by swinging movement of the carriage, arrives at a target track, and follows the track to record and play back data.

The magnetic head is moved by the VCM. The magnetic head detects a position signal recorded on a servo sector on the magnetic disk and knows the present position. The position signal detected by the magnetic head is amplified by a head signal amplifier and demodulated into a servo signal by a servo signal demodulator. The servo signal becomes a digital position signal via an A/D converter and is accepted via a bus into an MPU that is a control portion.

The A/D converter, a D/A converter, the MPU, a ROM, a RAM, and an interface controller are connected with this bus. Various kinds of control programs executed by the MPU are stored in the ROM. Furthermore, parameters necessary for various kinds of control are stored.

The position signal accepted into the MPU is processed by the MPU. A VCM control signal is created by the following method. First, the interface controller receives a command of a host-side controller and issues an access request for recording and playback to the MPU. When the command making a request of recording and playback of data is issued, the MPU implements a positioning method recorded in the ROM and creates an optimum VCM control signal according to the distance from the present head position indicated by the accepted position signal to the target position. The created VCM control signal is output to the bus and becomes a power amplifier control signal through the D/A converter. The signal is input to a power amplifier. The input power amplifier control signal is converted into an electrical current by the power amplifier and applied to the VCM. According to the applied electrical current, the VCM produces a driving force for the actuator to place the magnetic head into a target position.

In magnetic disk drives that are external storages for computers, the track width is reduced year by year in order to increase the storage capacity. In order to place the magnetic head in position accurately relative to the track width, it is necessary to improve the positioning accuracy in pursuit to the track width that is reduced year by year. It is necessary that this be achieved in a high-speed operation. Vibrations synchronized to rotation of the disk that are factors deteriorating the positioning accuracy and vibrations by the effects of wind produced inside the apparatus, and so on deteriorate the positioning accuracy at a certain frequency. For example, if the center of rotation of the magnetic disk and the center of the track deviate, the magnetic head must vary its position radially to follow the track even when the magnetic head follows the same track. The situation is the same when the track is not a genuine circle but is distorted. In this case, motion of the magnetic head becomes vibrations of a frequency synchronized to rotation of the magnetic disk. The accuracy of pursuit at this frequency deteriorates. Also, as the magnetic head rotates, wind is produced near the surface of the magnetic disk. This wind produces vibrations of the magnetic head, deteriorating the positioning accuracy. The vibrations occur at a certain frequency that is affected by the structure of the magnetic head or carriage and by the rotational frequency of the magnetic disk.

As mentioned previously, vibrations of the position signal synchronized to rotation of the disk and vibrations of the mechanical system are factors deteriorating the positioning accuracy. These appear as vibrations of the position signal. Control that sufficiently suppresses such vibrations is necessary. A prior art technique for this is available, for example, in JP-A-5-298842 (Patent Reference 1). A technique of placing the magnetic head in position in pursuit of the eccentric component contained in the positional information is disclosed. In the magnetic disk drive of this Patent Reference 1, a method is shown which consists of creating a control signal for suppressing the vibrations using a mathematical model and a low-pass filter limiting the band and applying the control signal as a servo control signal to place the magnetic head in position. The mathematical model has resonant points at vibrational frequencies due to disk rotation, external disturbances, and so on.

Other prior art techniques are described in JP-A-2002-352534 (Patent Reference 2) and JP-A-2003-331543 (Patent Reference 3). Methods of designing a resonant filter are shown, the filter achieving a mechanical resonant mode having a resonant point close to the frequency at which the positioning accuracy is improved. In the magnetic disk drive of Patent Reference 2, a method of coupling a resonant filter having stable phase conditions in series to the object to be controlled is shown. In the magnetic disk drive of Patent Reference 3, a method of coupling a resonant filter having stable phase conditions in parallel to an object to be controlled is shown.

BRIEF SUMMARY OF THE INVENTION

In the method using a low-pass filter limiting the band as shown in Patent Reference 1, the stability cannot be assured in a case where the frequency of the produced resonance control signal exceeds the gain 0 dB crossover frequency (frequency at which the ratio of the amplitude of the output to the amplitude of the input is 1) in the open-loop transfer characteristics of the control system or the frequency of the first-order resonance (major resonance) of the mechanical system limiting the servo bandwidth. It is likely that the control system diverges.

It has been found that in the methods shown in Patent References 2 and 3, positioning error due to external disturbances can be reduced in a frequency range where a resonant mode having stable phase conditions is present. However, in the range of frequencies (frequencies at which the open-loop phase characteristic is in the neighborhood of −180°) at which the resonant mode becomes unstable irrespective of phase conditions, it is difficult to assure the stability. Especially, the region (where the gain of the sensitivity function is greater than 1) where external disturbance vibrations are amplified is a frequency at which the open-loop phase characteristic is in the neighborhood of −180°. Therefore, that the application at that frequency is limited is a great limitation.

It is a feature of the present invention to provide a magnetic disk drive capable of improving the positioning accuracy without hurting the stability of the control system even at frequencies exceeding the servo bandwidth and major resonance and at frequencies where the open-loop phase characteristic becomes unstable.

A first aspect of the present invention is directed to a magnetic disk that records information; a magnetic head that records information on the magnetic disk or plays back the information on the magnetic disk; an actuator that drives the magnetic head; and a control portion that creates a control signal for controlling the magnetic head such that it assumes a target position, based on a given target position signal and on a position signal played back by the magnetic head, the control portion controlling an object to be controlled including the magnetic head and the actuator. The control portion is configured such that (i) a resonant characteristic is present in open-loop transfer characteristics when the control portion and the controlled object are connected, at a frequency other than a mechanical resonant frequency of the controlled object, (ii) a frequency of the resonant characteristic is higher than a frequency at which a gain characteristic of the open-loop transfer characteristics becomes 0 dB, and (iii) the phase of the open-loop transfer characteristics at the frequency of the resonant characteristic is arctangent ((Rop+1)/Iop) when coordinates of a vector locus of the open-loop transfer characteristics are (Rop, Iop) at the frequency of the resonant characteristic.

A more preferable example of specific configuration in the first embodiment of the present invention as described above is as follows.

(1) A vector locus obtained by representing on a Nyquist diagram the open-loop transfer characteristics when the control portion and the controlled object are connected has such characteristics as to create a dextrorotatory circular locus in a direction going away from coordinates (−1, 0) of an unstable point on the Nyquist diagram with increasing the frequency near a frequency at which positioning accuracy should be improved.

A second aspect of the present invention relates to a magnetic disk that records information; a magnetic head that records information on the magnetic disk or plays back the information on the magnetic disk; an actuator that drives the magnetic head; and a control portion that creates a control signal for controlling the magnetic head such that it assumes a target position, based on a given target position signal and on a position signal played back by the magnetic head, the control portion controlling an object to be controlled consisting of the magnetic head and the actuator. The control portion comprises: (a) a compensator that accepts an error signal as its input, the error signal being based on the given target position signal and on the position signal played back by the magnetic head, the compensator creating a control signal to make a phase compensation so as to stabilize the mechanical resonant mode existing in the controlled object; (b) a resonant filter accepting the control signal created by the compensator as its input, the filter having a resonant characteristic at or near a frequency at which the given positioning accuracy should be improved; and (c) a modal phase filter that operates phase characteristics of the resonant filter.

A more preferable example of specific configuration in the second embodiment of the present invention as described above is as follows.

(1) The control portion has (i) an error detection portion which takes out the difference between the given target position signal and the position signal played back by the magnetic head as an error signal and which outputs the error signal to the compensator and (ii) an adder portion that sums up the control signal created by the modal phase filter and the control signal created by the compensator and outputs the sum signal to the controlled object as a control signal.

(2) The control portion has (i) an adder portion that sums up the control signal created by the modal phase filter and the position signal played back by the magnetic head and (ii) an error detection portion that takes out the difference between the given target position signal and the position signal created by the adder portion as an error signal and outputs this error signal to the compensator.

(3) A vector locus obtained by representing on a Nyquist diagram the open-loop transfer characteristics when the control portion and the controlled object are connected has such characteristics as to create a dextrorotatory circular locus in a direction going away from coordinates (−1, 0) of an unstable point on the Nyquist diagram with increasing the frequency near a frequency at which positioning accuracy should be improved.

(4) The control portion has a plurality of resonant filters and a plurality of modal phase filters.

According to the magnetic disk drive of the present invention, the positioning accuracy can be improved without hurting the stability of the control system even at frequencies exceeding the servo bandwidth and major resonance and at frequencies at which the open-loop phase characteristics become unstable.

BRIEF DESCRIPTION OF THE DRAWINGS

FIG. 12 is a diagram showing a vector locus of the open-loop transfer characteristic of the positioning control system in the second embodiment.

FIG. 13 is a diagram showing the sensitivity function gain characteristics of the open-loop transfer characteristic of the positioning control system in the second embodiment.

DETAILED DESCRIPTION OF THE INVENTION

A plurality of embodiments of the present invention are hereinafter described using figures. The same symbols in the figures of the embodiments indicate the same or corresponding objects.

A magnetic disk drive of the first embodiment of the present invention is described using FIGS. 1 to 10.

Figure 1:
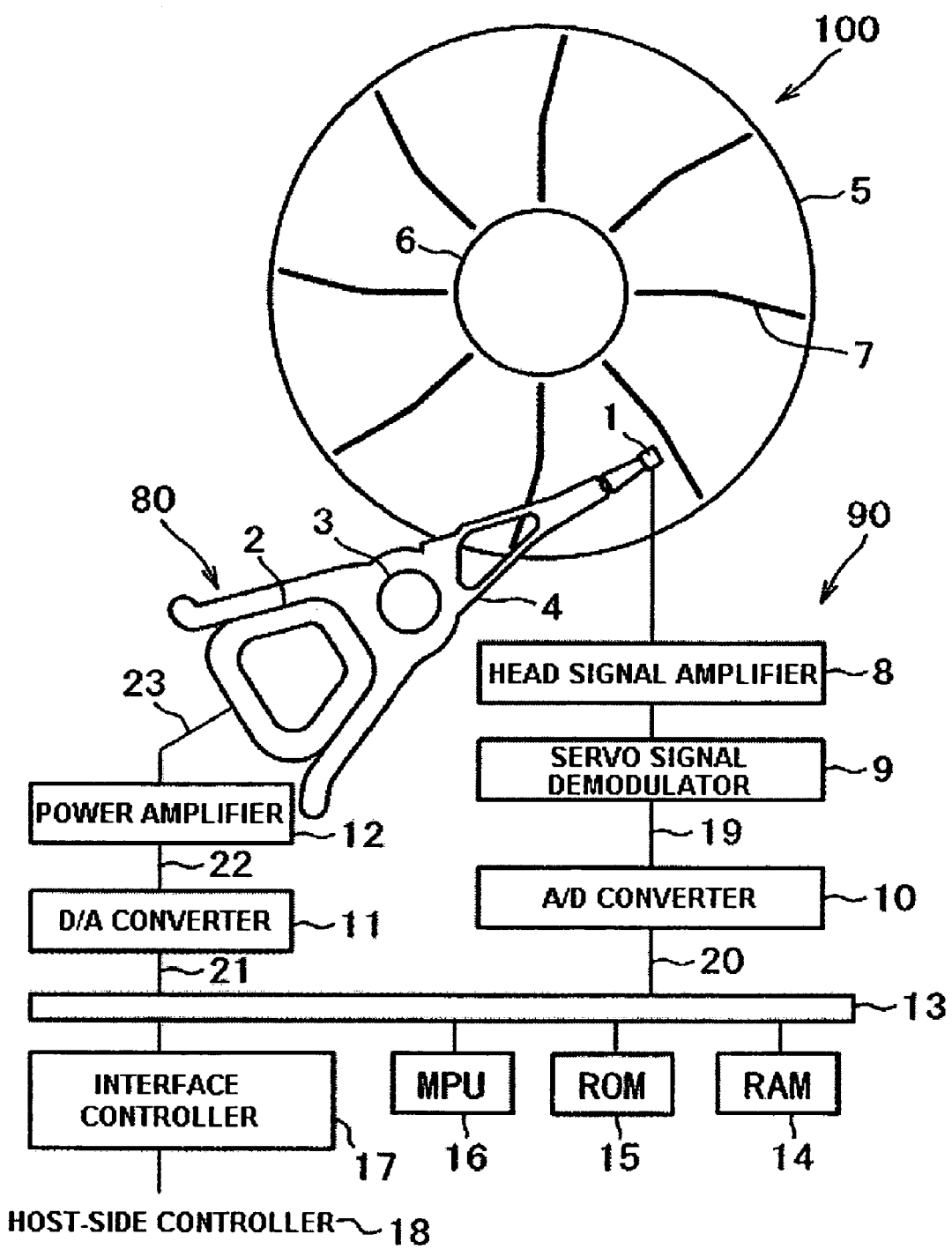
FIG. 1 is a structural view of a magnetic disk drive of a first embodiment of the present invention.

First, the whole configuration of a magnetic disk drive 100 of the present embodiment is described with reference to FIG. 1. FIG. 1 is a structural view of the magnetic disk drive of the present embodiment. The magnetic disk drive 100 is constructed to include a magnetic disk 5, a spindle motor 6, a pivot bearing 3, a carriage 4, a voice coil motor 2, a magnetic head 1, and a positioning control system 90. The magnetic disk 5 is a disklike recording medium that records information, and has a servo sector 7 in a given position of each track. Servo information including positional information and so on have been previously recorded in the servo sector. The spindle motor 6 is positioned in a central portion of the magnetic disk 5 and acts to rotate the magnetic disk 5 in a determined rotational frequency. The pivot bearing 3 is placed radially outside of the magnetic disk 5 and mounted such that the axis of the pivot bearing 3 is parallel to the spindle motor shaft. The carriage 4 is fixed to this pivot bearing 3 and can swing together with this pivot bearing 3. The voice coil motor (VCM) 2 acts to drive this carriage 4 and swings the carriage 4 about the pivot bearing 3. The magnetic head 1 is fixed to the front end of this carriage 4. The magnetic head is radially moved over the surface of the magnetic disk 5 by swinging motion of the carriage 4 and arrives at a target track. The head follows the track and records and plays back data. In this way, power for moving the magnetic head 1 is produced by the voice coil motor 2. Also, the carriage 4 and the VCM 2 constitute an actuator 80 for the magnetic head 1.

The positioning controller 90 is connected with the magnetic head 1 and with the VCM 2. The controller receives a servo signal including a position signal and so on from the magnetic head 1 and supplies the VCM control signal to the VCM 2. The positioning control system 90 is constructed to have a head signal amplifier 8 connected with the magnetic head 1 by a signal line, a servo signal demodulator 9 connected with the head signal amplifier 8, an A/D converter 10 connected with the servo signal demodulator 9, a bus 13 connected with the A/D converter 10, a RAM 14, a ROM 15, an MPU 16, and an interface controller 17 connected with the bus 13, a D/A converter 11 whose input side is connected with the bus 13 and whose output side is connected with a power amplifier 12, and the power amplifier 12 whose input side is connected with the D/A converter 11 and whose output side is connected with the VCM 2.

The servo information including positional information recorded in the servo sector 7 on the magnetic disk 5 is detected by the magnetic head 1, amplified by the head signal amplifier 8, and demodulated by the servo signal demodulator 9. The demodulated servo signal 19 is digitized by the A/D converter 10. The digitized servo signal contains the position signal 20. The position signal 20 obtained in this way is accepted via the bus 13 into the MPU 16 that is a control portion.

The ROM 15 and the RAM 14 are connected via the bus 13 with the MPU 16. Various kinds of control programs executed by the MPU 16 are stored in the ROM 15. Parameters necessary for various kinds of control are also stored. Furthermore, the interface controller 17 is connected via the bus 13 with the MPU 16. The interface controller 17 receives a command from a host-side controller 18 and issues an access request for recording or playback to the MPU 16. When the command requesting recording or playback of data is issued, the MPU 16 executes a program for positioning control, the program being stored in the ROM 15, finds the distance to a target position from the input position signal 20, and creates an optimum VCM control signal 21 according to this distance to be moved. The created VCM control signal 21 becomes a power amplifier control signal 22 via the D/A converter 11. The signal is converted into an electrical current 23 via the power amplifier 12 and applied to the VCM 2 as an operation signal. In this way, the magnetic head 1 is placed into the target position of the magnetic disk 5.

The positioning controller 90 of the present embodiment has a great feature in the processing method of the MPU 16 that receives the position signal 20 and creates the VCM controller signal 21.

Figure 2:
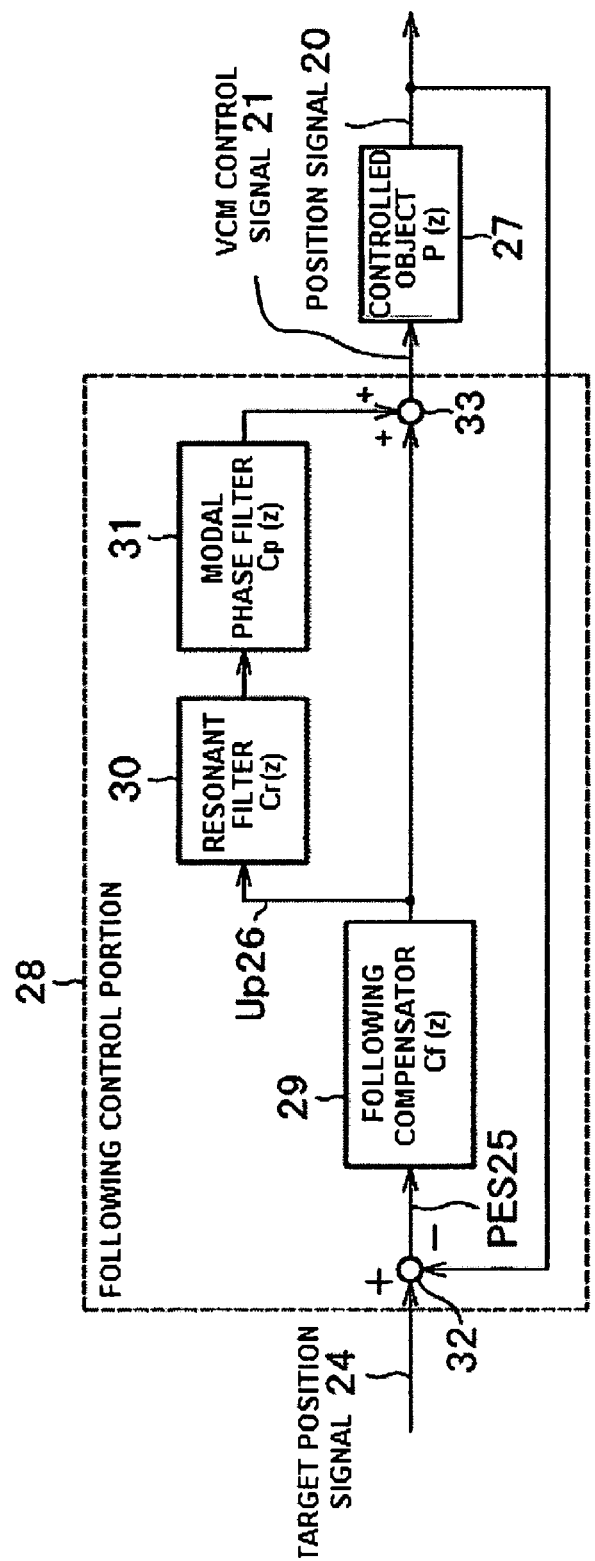
FIG. 2 is a block diagram of a positioning control system of the magnetic disk drive of FIG. 1.
Figure 3:
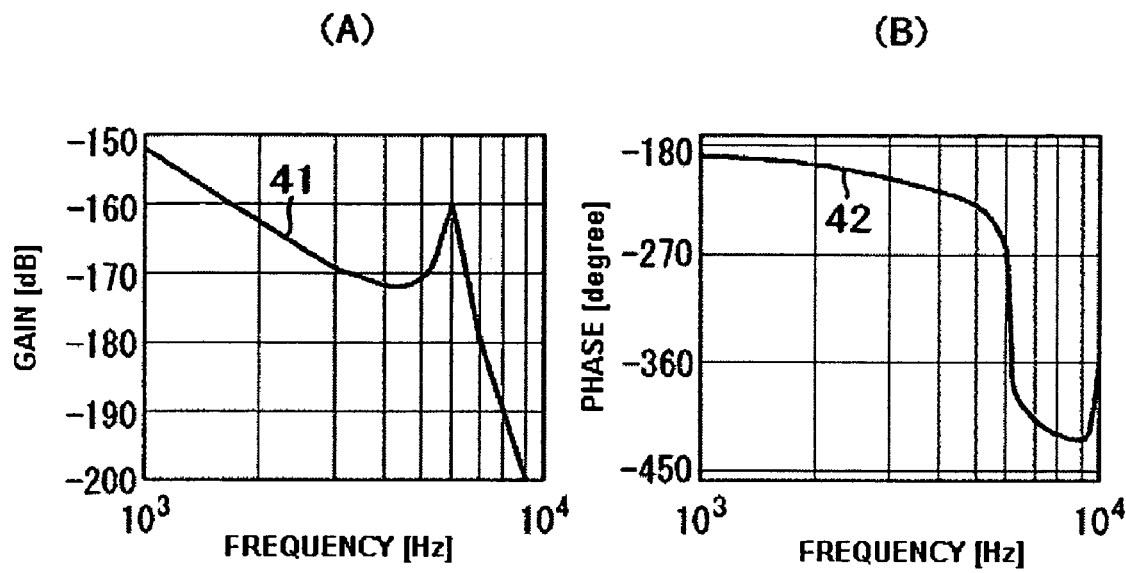
FIG. 3 shows the transfer characteristics of the controlled object of FIG. 2, and in which (A) shows an example of its gain characteristic and (B) shows an example of phase characteristic.

The positioning controller 90 is next described with reference to FIGS. 2 and 3. FIG. 2 is a block diagram of the control system of the magnetic disk drive of the present embodiment and shows an example of configuration of the system in which a resonant filter 30 is coupled in series to an object 27 to be controlled. FIG. 3 shows the transfer characteristic P(z) of the controlled object 27 at this time. FIG. 3(A) shows its gain characteristic 41. FIG. 3(B) shows its phase characteristic 42.

The control system in FIG. 2 is made up of the controlled object 27 and a following control portion 28. The controlled object 27 is configured to have the magnetic head 1 and the actuator 80. In particular, the object receives the VCM control signal 21 computed by the MPU 16, outputs the digitized position signal 20, and is made of the portion ranging from the D/A converter 11 to the A/D converter 10. The transfer characteristic P(z) represents the input-output characteristics of this controlled object 27.

The following control portion 28 is configured to have an error detection portion 32, a resonant filter 30 (whose transfer characteristic is given by Cr(z)), a modal phase filter 31 (whose transfer characteristic is given by Cp(z)), a following compensator 29 (whose transfer characteristic is given by Cf(z)), and an adder portion 33. The resonant filter 29 is intended to achieve resonant characteristics having stable phase conditions. The following compensator 29 is intended to achieve desired control performance.

In this following control portion 28, if a command containing the target position signal 24 is issued from the host-side controller 18, an error signal PES (position error signal) 25 that is a differential signal between the given target position signal 24 and the position signal 20 played back by the magnetic head 1 is created by the error detection portion 32. By entering this error signal PES 25 into the following compensator 29, a control signal Up 26 for making a phase compensation to stabilize the mechanical resonant mode existing in the controlled object 27 is created by the following compensator 29 and outputted. This control signal Up 26 is entered into the resonant filter 30. The resonant filter 30 has a resonant characteristic at or near the given frequency at which the positioning accuracy should be improved. The control signal Up 26 is filtered through the filter and outputted. The output from the resonant filter 30 is entered into the modal phase filter 31. The modal phase filter 31 is intended to operate the phase characteristics regarding the resonant filter 30. The output from the resonant filter 30 is filtered through the filter and outputted. A control signal outputted from the modal phase filter 31 and the control signal Up 26 outputted from the following compensator 29 are summed up by the adder portion 33 to create the VCM control signal 21. This VCM control signal 21 is outputted to the controlled object 27.

Specific examples of the controlled object 27 and following control portion 28 are described in further detail. First, it is assumed that the controlled object 27 has been discretized with a zero-order-hold under the assumption that a mechanical system model Ps(s) given by the formula (Mathematical Formula 1) consisting of a rigid body mode and one mechanical resonant mode is a digital control system. At this time, the sampling time is set to Ts. In the formula (Mathematical Formula 1), the rigid body mode is $1/S^2$. The mechanical resonant mode is $\alpha r/(S^2+2\cdot\zeta r\cdot\omega r\cdot S+\omega r^2)$.

[Mathematical Formula 1]

$$Ps(s) = \frac{1}{S^2} + \frac{\alpha r}{S^2 + 2\cdot\varsigma r\cdot\omega r\cdot s + \omega r^2} \quad \text{(Mathematical Formula 1)}$$

For example, in the equation (Mathematical Formula 1), we set mode effect constant $\alpha r=-1$, viscosity coefficient $\zeta r=0.03$, and resonant frequency $\omega r=6000\times 2\pi$ [rad/s]. The sampling time Ts is set to 50µs. In this case, the gain characteristic 41 of the transfer characteristic P(z) of the controlled object 27 is shown in FIG. 3(A). Its phase characteristic 42 is shown in FIG. 3(B). In the controlled object 27 of FIG. 3, the mode effect constant αr of the mechanical resonant mode is negative, and is reverse in sign (opposite phase) to the mode effect constant 1 of the rigid body mode. The resonant frequency ωr referred to herein is a natural vibration frequency of the carriage 4, for example.

Figure 4:
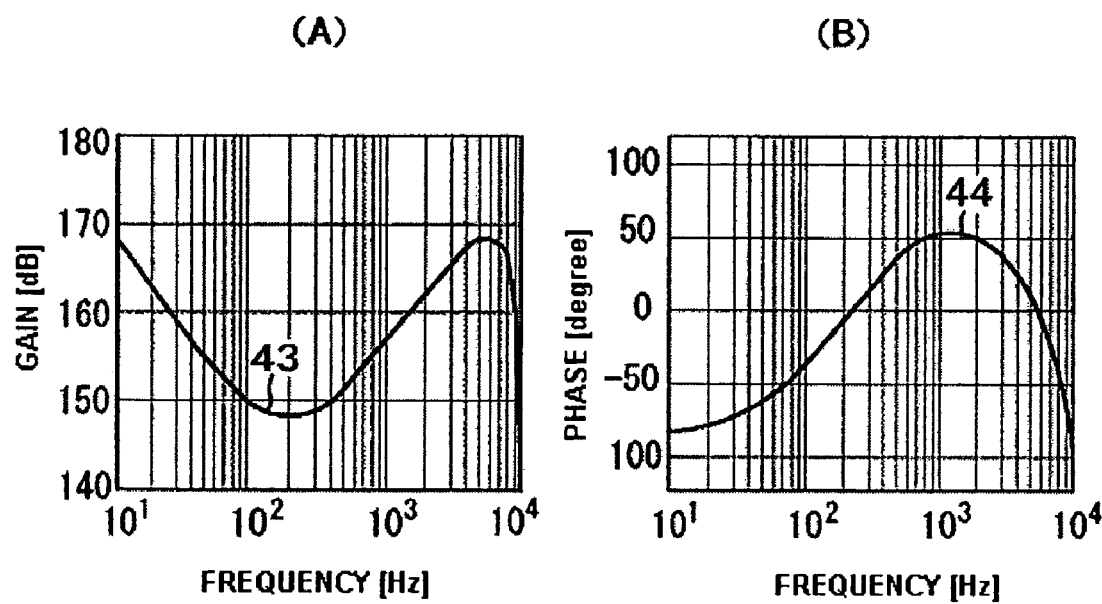
FIG. 4 shows the transfer characteristics of the following compensator in FIG. 3, and in which (A) shows an example of its gain characteristic and (B) shows an example of phase characteristic.
Figure 5:
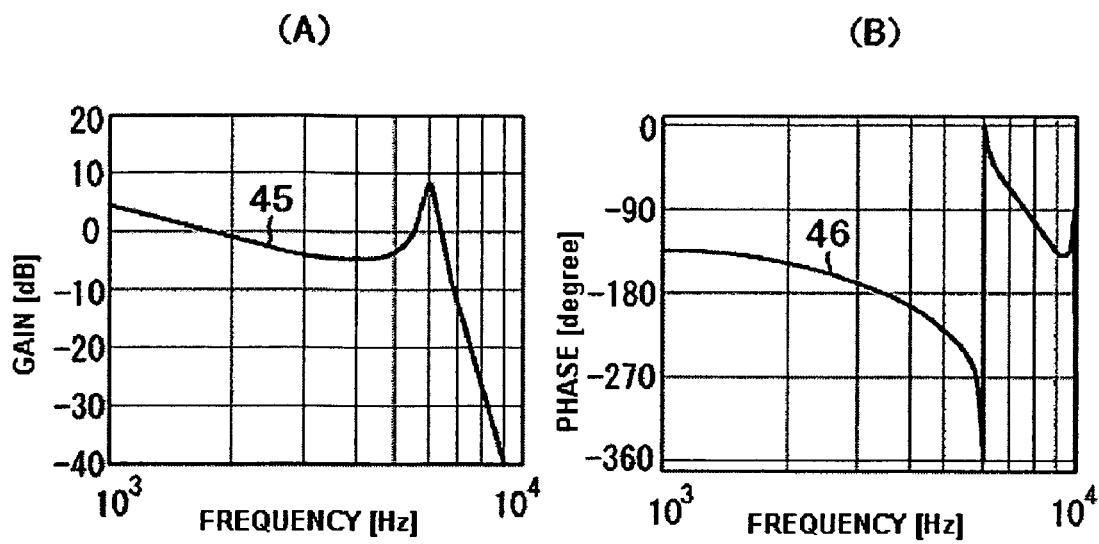
FIG. 5 shows the open-loop transfer characteristics composed of a controlled object having the characteristics of FIG. 3 and the following compensator having the characteristics of FIG. 4, and in which (A) shows an example of its gain characteristic and (B) shows an example of phase characteristic.
Figure 6:
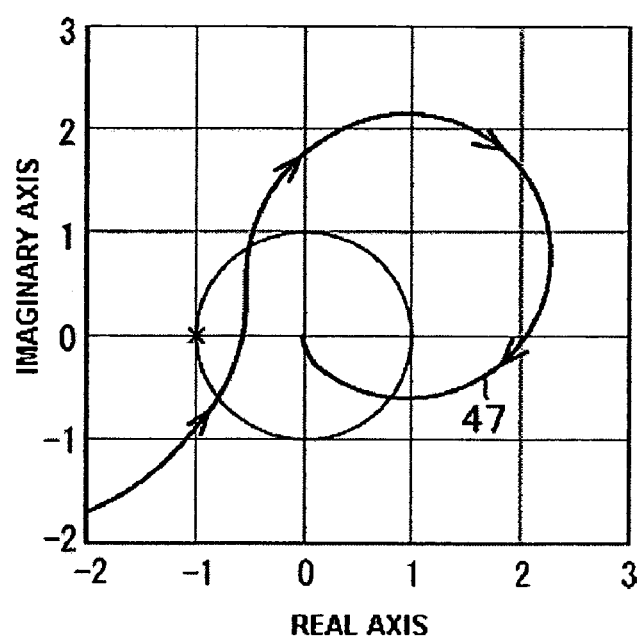
FIG. 6 is a vector locus of the open-loop transfer characteristics of FIG. 5.
Figure 7:
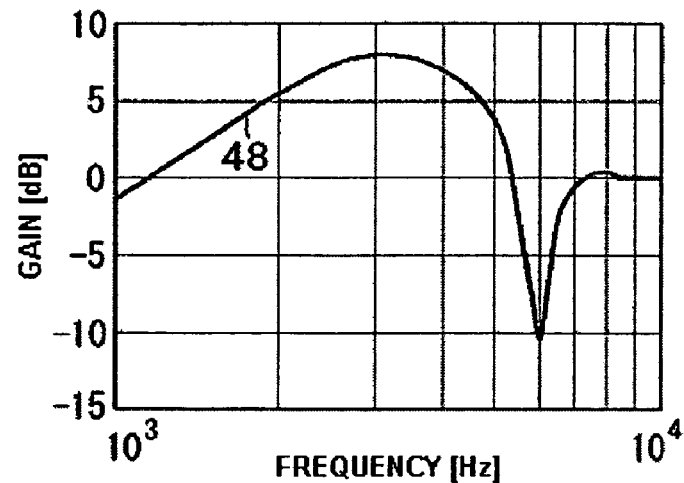
FIG. 7 shows the gain characteristic of a sensitivity function corresponding to the open-loop transfer characteristic of FIG. 5.

The following compensator 29 is next described with reference to FIGS. 4 to 7. FIG. 4 shows the transfer characteristic Cf(z) of the following compensator 29 in the above-described case. FIG. 4(A) shows its gain characteristic 43. FIG. 4(B) shows its phase characteristic 44. FIG. 5 shows the open-loop transfer characteristic Cf(z)·P(Z) in a case where the controlled object 27 having the characteristic of FIG. 3 and the following compensator 29 having the characteristic of FIG. 4 are coupled in series. FIG. 5(A) shows its gain characteristic 45. FIG. 5(B) shows its phase characteristic 46. FIG. 6 shows a vector locus 47 on a Nyquist diagram of the open-loop transfer characteristic Cf(z)·P(z) of FIG. 5. FIG. 7 shows the gain characteristic 48 of a sensitivity function corresponding to the open-loop transfer characteristic Cf(z)·P(Z) shown in FIGS. 5 and 6.

The following compensator 29 is set to have the following characteristics, for example. A first-order integration characteristic is given in a low-frequency range such that no steady-state deviation is produced even where an external force acts on the control system. Also, a phase lead characteristic is given such that the phase leads at 1 kHz to 2 kHz are increased to stabilize the rigid body mode. Furthermore, in order to stabilize the phase of the mechanical resonant mode, a phase lag characteristic that delays the phase below 5 kHz is given. With respect to the proportional gain of the following compensator 29, its gain characteristic is given such that the gain 0 dB crossover frequency (frequency at which the ratio of the amplitude of the output to the amplitude of the input is 1) at the open-loop transfer characteristic of the control system is 1700 Hz. At this time, the transfer characteristic Cf(z) of the following compensator 29 is represented by the gain characteristic 43 of FIG. 4(A) and the phase characteristic 44 of FIG. 4(B).

Where the control system is stable, the size of the sensitivity function at an arbitrary frequency is the reciprocal of the distance between the vector locus 47 of the open-loop transfer characteristic on the Nyquist diagram and the coordinates (−1, 0) of an unstable point. Therefore, where there is a dextrorotatory circular locus in a direction going away from the coordinates (−1, 0) of the unstable point with increasing the frequency near the subject frequency, the gain of the sensitivity function at the subject frequency decreases. It can be confirmed from the open-loop transfer characteristic Cf(z)·P(Z) of FIG. 5 and the vector locus 47 of FIG. 6 that the vector locus 47 of the control system at the frequency of the mechanical resonant mode possessed by the controlled object 27 is a circular locus going away from the unstable point (−1, 0). This means that the mechanical resonant mode possessed by the controlled object 27 is stabilized by the following compensator 29.

A method of design that achieves a resonant mode having stable phase conditions, which is a feature of the present invention, by the resonant filter 30 and modal phase filter 31 is next shown. The transfer characteristic of a resonant mode Fr(s) is defined in the formula (Mathematical Formula 2).

[Mathematical Formula 2]

$$\frac{\alpha v}{S^2 + 2\cdot\varsigma v\cdot\omega_{nv}\cdot s + \omega nv^2} \quad \text{(Mathematical Formula 2)}$$

where αv shows a mode effect constant, ζv shows a viscosity coefficient, and ωnv shows a resonant frequency. A transfer characteristic consisting of the mechanical system model Ps(s) to which the resonant mode Fr(s) is added can be shown as in the formula (Mathematical Formula 3).

[Mathematical Formula 3]

$$Ps(S) + Fr(S) = Ps(S)\cdot\left(1 + \frac{Fr(S)}{Ps(S)}\right) \quad \text{(Mathematical Formula 3)}$$

The formula (Mathematical Formula 3) indicates that resonant mode Fr(s) can be added to the mechanical system model Ps(s) by coupling (1+Fr(s)/Ps(s)) in series to the controlled object 27. Therefore, the transfer characteristic Cr(z) of the resonant filter 30 is defined to be a transfer characteristic obtained by discretizing (Fr(s)/Ps(s)) by bilinear transform, matched pole-zoro method, or the like.

The phase of the transfer characteristic Cp(z) of the modal phase filter 31 is so adjusted that the vector locus of the open-loop transfer characteristic becomes a trajectory going away from the unstable point (−1, 0) near the resonant frequency ωnv of the resonant mode Fr(s) added by the resonant filter. At the resonant frequency ωnv, if the coordinates of the vector locus of the open-loop transfer characteristic are given by coordinates (Rop, Iop), a phase Drm [rad] in a direction away from the unstable point (−1, 0) is expressed by the formula (Mathematical Formula 4). Note that "arctan" in the formula (Mathematical Formula 3) is an abbreviation of an arctangent.

[Mathematical Formula 4]

$$DRM = \arctan\left(\frac{Rop+1}{Iop}\right) \quad \text{(Mathematical Formula 4)}$$

Here, if the phase of the resonant filter Cr(z) at the resonant frequency ωnv is Dcr [rad] and the phase of the open-loop transfer characteristic at the resonant frequency ωnv is Dop [rad], and if the phase Dcp [rad] of the modal phase filter 31 at the resonant frequency ωnv is Drm−Dcr−Dop, then it is possible to make the vector locus of the control system assume a trajectory going away from the unstable point (−1, 0) at the resonant frequency of the resonant mode.

In the following, a filter obtained by discretizing the transfer characteristic Cp(z) of the modal phase filter 31 by a bilinear transform as given by the formula (Mathematical Formula 5) is described.

[Mathematical Formula 5]

$$\frac{\beta_1 \cdot s + \beta_2}{\alpha cp \cdot s + 1} \quad \text{(Mathematical Formula 5)}$$

Here, the maximum gain of the modal phase filter 31 is set to 1. Where the phase Dcp of the modal phase filter at the frequency ωnv is −π or more and −0.5π or less, the parameters of the formula (Mathematical Formula 5) are as given by the formula (Mathematical Formula 6).

[Mathematical Formula 6]

$$\alpha cp = \frac{1}{\tan(Dcp) \cdot \omega nv},$$
$$\beta_1 = -(\omega nv^{-2} + \alpha cp^2)^{0.5},$$
$$\beta_2 = 0$$

(Mathematical Formula 6)

Where the phase Dcp of the modal phase filter at the frequency ωnv is −0.5π or more and 0 or less, the parameters of the formula (Mathematical Formula 5) are as given by the formula (Mathematical Formula 7).

[Mathematical Formula 7]

$$\alpha cp = \frac{-\tan(Dcp)}{\omega nv},$$
$$\beta_1 = 0,$$
$$\beta_2 = (1 + \omega nv^2 \alpha cp^2)^{0.5}$$

(Mathematical Formula 7)

Where the phase Dcp of the modal phase filter at the frequency ωnv is 0 or more and 0.5π or less, the parameters of the formula (Mathematical Formula 5) are as given by the formula (Mathematical Formula 8).

[Mathematical Formula 8]

$$\alpha cp = \frac{1}{\tan(Dcp) \cdot \omega nv},$$
$$\beta_1 = (\omega nv^{-2} + \alpha cp^2)^{0.5},$$
$$\beta_2 = 0$$

(Mathematical Formula 8)

Where the phase Dcp of the modal phase filter at the frequency ωnv is 0.5π or more and π or less, the parameters of the formula (Mathematical Formula 5) are as given by the formula (Mathematical Formula 9).

[Mathematical Formula 9]

$$\alpha cp = \frac{-\tan(Dcp)}{\omega nv},$$
$$\beta_1 = 0,$$
$$\beta_2 = -(1 + \omega nv^2 \alpha cp^2)^{0.5}$$

(Mathematical Formula 9)

Where the Dcp is a value from −2π to −π or from π to 2π, the calculation is again performed with inverted sign (positive or negative) of the mode effect constant αv.

The control system is next described while citing specific examples of numerical values. It is assumed that the open-loop transfer characteristic prior to application of the present embodiment is as shown in FIG. 6. For example, the frequency of an external disturbance to be suppressed is assumed to be 3300 Hz at which the phase of the open-loop transfer characteristic is close to −180°. The resonant frequency ωnv of the resonant mode Fr(s) is set to 3300×2π [rad/s]. Furthermore, it is assumed that the mode effect constant αv is 0.01 and the viscosity coefficient ζv is 0.001. The coordinates of the vector locus of the open-loop transfer characteristic at 3300 Hz are (−0.601, −0.456). As a result, the phase Dcp of the modal phase filter 31 at the resonant frequency ωnv should become 0.44×π [rad]. Accordingly, the parameters of the formula (Mathematical Formula 5) are selected to be: αcp=9.25×10$^{-6}$, β$_1$=4.91×10$^{-5}$, and β$_2$=0.

Figure 8:
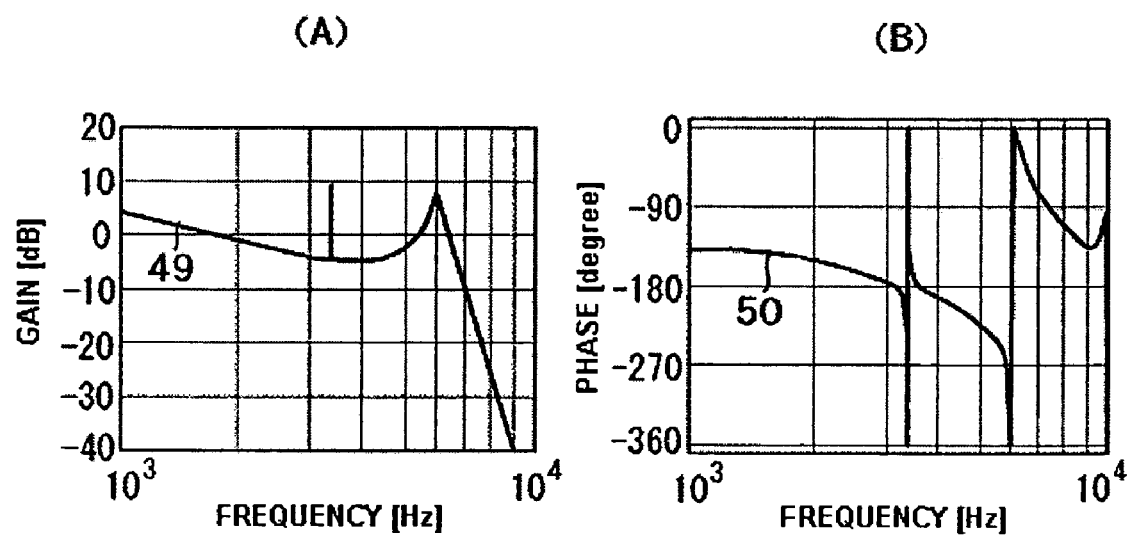
FIG. 8 shows open-loop transfer characteristics in a case where a first embodiment of the present invention is applied, and in which (A) shows an example of its gain characteristic and (B) shows an example of phase characteristic.
Figure 9:
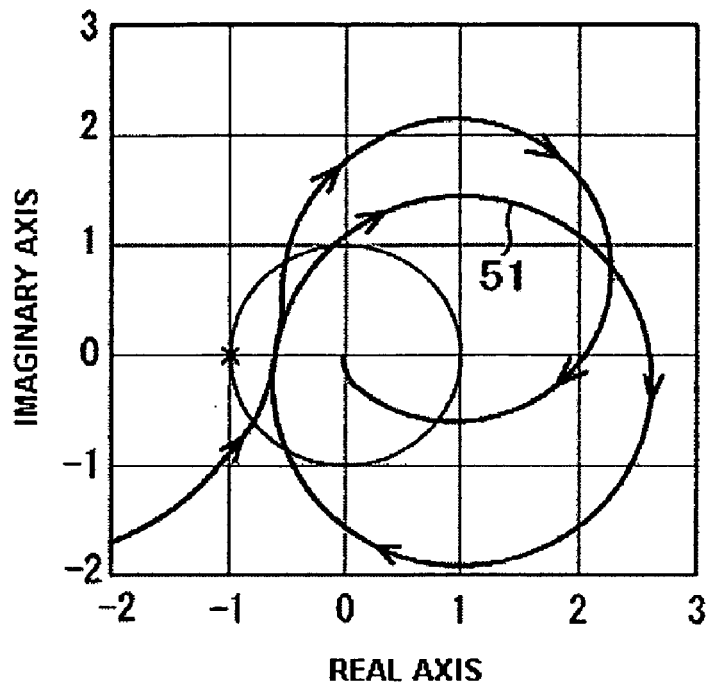
FIG. 9 is a vector diagram of the characteristics of FIG. 8.
Figure 10:
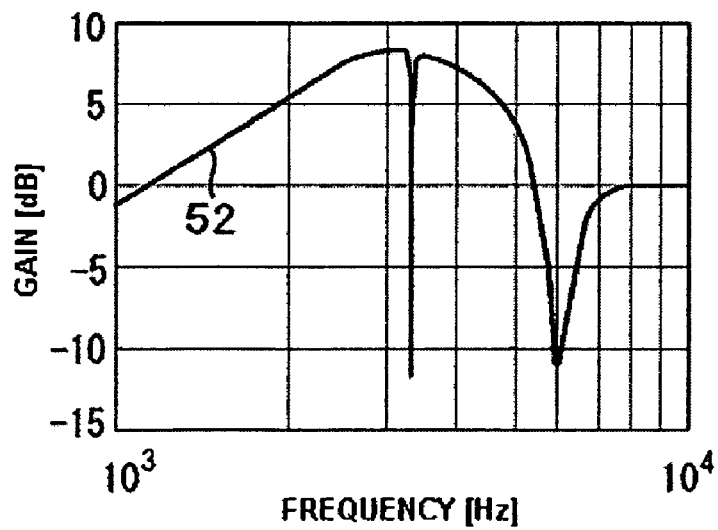
FIG. 10 shows a gain characteristic of a sensitivity function corresponding to the characteristics of FIG. 8.

The gain characteristic 49 and phase characteristic 50 of the open-loop transfer characteristic in a case where the control system of the present embodiment shown in FIG. 2 is applied are shown in FIG. 8. It can be confirmed from this FIG. 8 that a resonant characteristic is achieved at 3300 Hz that is a target frequency. The vector locus 51 of the open-loop transfer characteristic shown in FIG. 8 is shown in FIG. 9. A sensitivity function gain characteristic 52 corresponding to the open-loop transfer characteristics shown in FIGS. 8 and 9 is shown in FIG. 10. It can be confirmed from these figures that the sensitivity function at a local frequency at which an external disturbance is present can be improved greatly without hurting the stability of the control system even at frequencies at which the sensitivity function gain is increased and at which the phase of the open-loop transfer characteristic is in the neighborhood of −180°, by applying the resonant filter 30 and modal phase filter 31 according to the present embodiment.

As is obvious from the description provided so far, according to the present embodiment, the magnetic disk drive 100 capable of improving the position accuracy can be achieved without hurting the stability of the control system even at frequencies exceeding the servo bandwidth and major resonance and at frequencies at which the open-loop phase characteristic becomes unstable.

Figure 11:
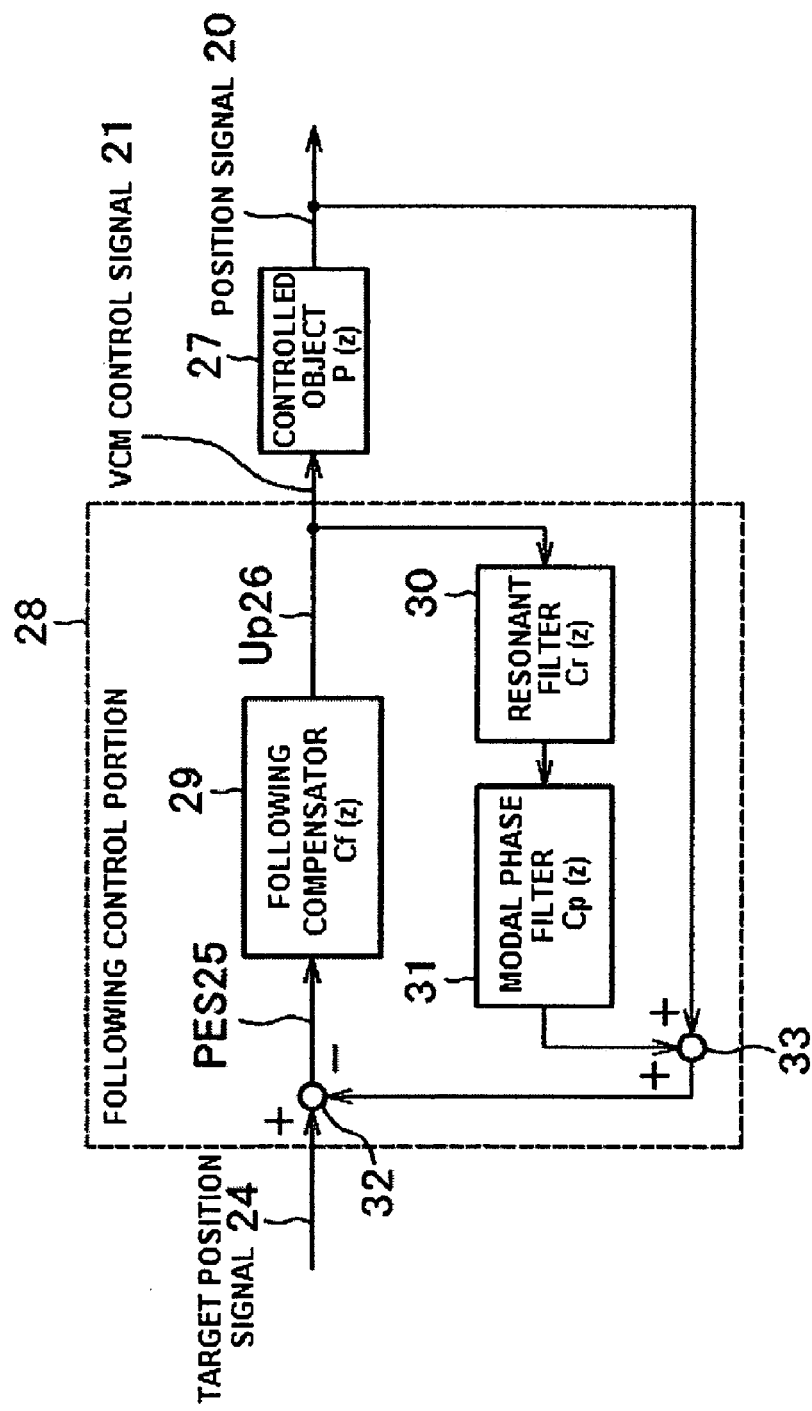
FIG. 11 is a block diagram of the positioning control system of a magnetic disk drive of a second embodiment of the present invention.
Figure 1:
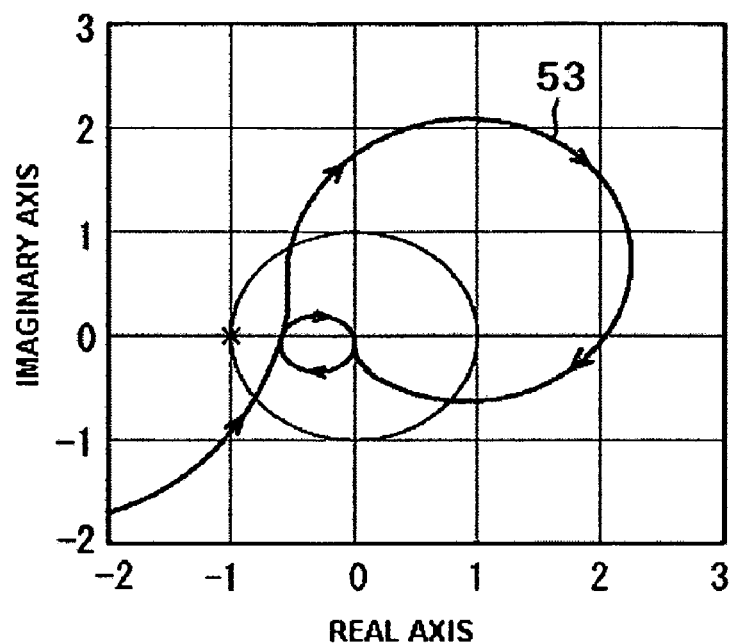
Figure 1:
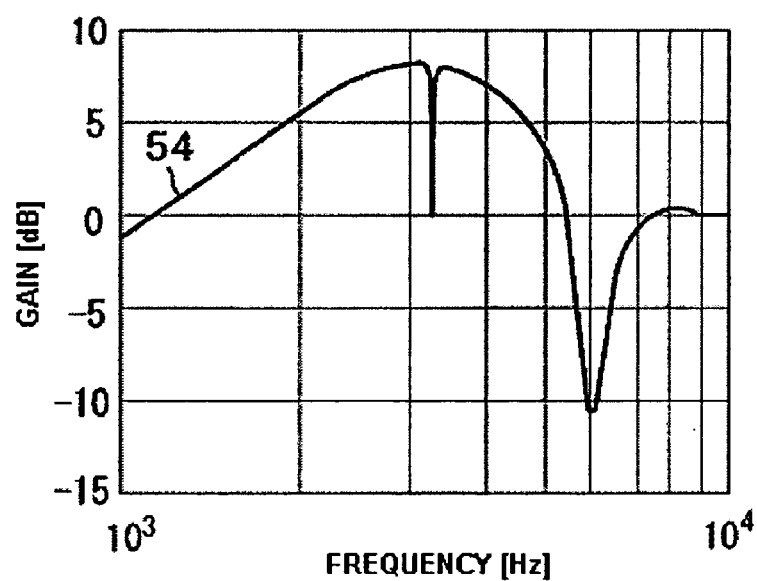

A magnetic disc drive 100 of a second embodiment of the present invention is next described using FIGS. 11 to 13. FIG. 11 is a block diagram of the control system of the magnetic disk drive 100 that is the second embodiment, and shows an example of configuration of a system in which a resonant filter 30 is coupled in parallel to a control object 27. FIG. 12 shows a vector locus 53 of the open-loop transfer characteristic of the control system in the second embodiment. FIG. 13 shows a sensitivity function gain characteristic 54 of the open-loop transfer characteristic of the control system in the second embodiment. This second embodiment is different from the first embodiment in the respects described next. In the other respects, the second embodiment is fundamentally identical with the first embodiment.

In the configuration of the control system shown in FIG. 11, a following compensator 29 creates a control signal Up 26 by entering an error signal PES 25 into the following compensator 29. This control signal Up 26 becomes a VCM control signal 21 and becomes an input to the controlled object 27 and resonant filter 30. The output from the resonant filter 30 is entered into the modal phase filter 31. The output signal from the modal phase filter 31 is added to a position signal 20 at the next sampling time.

A method of designing the resonant filter 30 and modal phase filter 31 in this second embodiment is described. In the second embodiment, the resonant filter 30 is assumed to be a digital filter in which the resonant mode Fr(s) has been discretized. Let Dcr [rad] be the phase of the transfer characteristic Cr(z) of the resonant filter 30 at the resonant frequency ωnv. Let Df [rad] be the phase of the transfer characteristic Cf(z) of the following compensator at the resonant frequency ωnv. At this time, if the phase Dcp [rad] of the modal phase filter 31 at the frequency ωnv is Drm−Dcr−Df, the vector locus of the control system can be made to assume a trajectory going away from the coordinates (−1, 0) of the unstable point at the frequency of the resonant mode.

The second embodiment is hereinafter described while citing specific examples of numerical values. It is assumed that the open-loop transfer characteristic prior to application of the second embodiment is as shown in FIG. 6. For example, the frequency of a suppressed external disturbance is assumed to be 3300 Hz at which the phase of the open-loop transfer characteristic is close to −180°. The resonant frequency ωnv of the resonant mode Fr(s) is set to 3300×2π [rad/s]. Furthermore, it is assumed that the mode effect constant αv is 0.01 and the viscosity coefficient ζv is 0.001. The coordinates of the vector locus of the open-loop transfer characteristic at 3300 Hz are (−0.601, −0.456). As a result, the phase Dcp of the modal phase filter 31 at the frequency ωnv should become 0.27×π [rad]. Accordingly, the parameters of the formula (Mathematical Formula 5) are selected to be: αcp=4.25× $10^{-5}$, $\beta_1$=6.43×$10^{-5}$, and $\beta_2$=0.

It can be confirmed from FIGS. 12 and 13 that the sensitivity function at a local frequency where an external disturbance exists can be improved without hurting the stability of the control system at the frequency at which the phase of the open-loop transfer characteristic is in the neighborhood of −180° and at which the sensitivity function gain is increased, by applying the resonant filter 30 and modal phase filter 31 according to the second embodiment.

Figure 14:
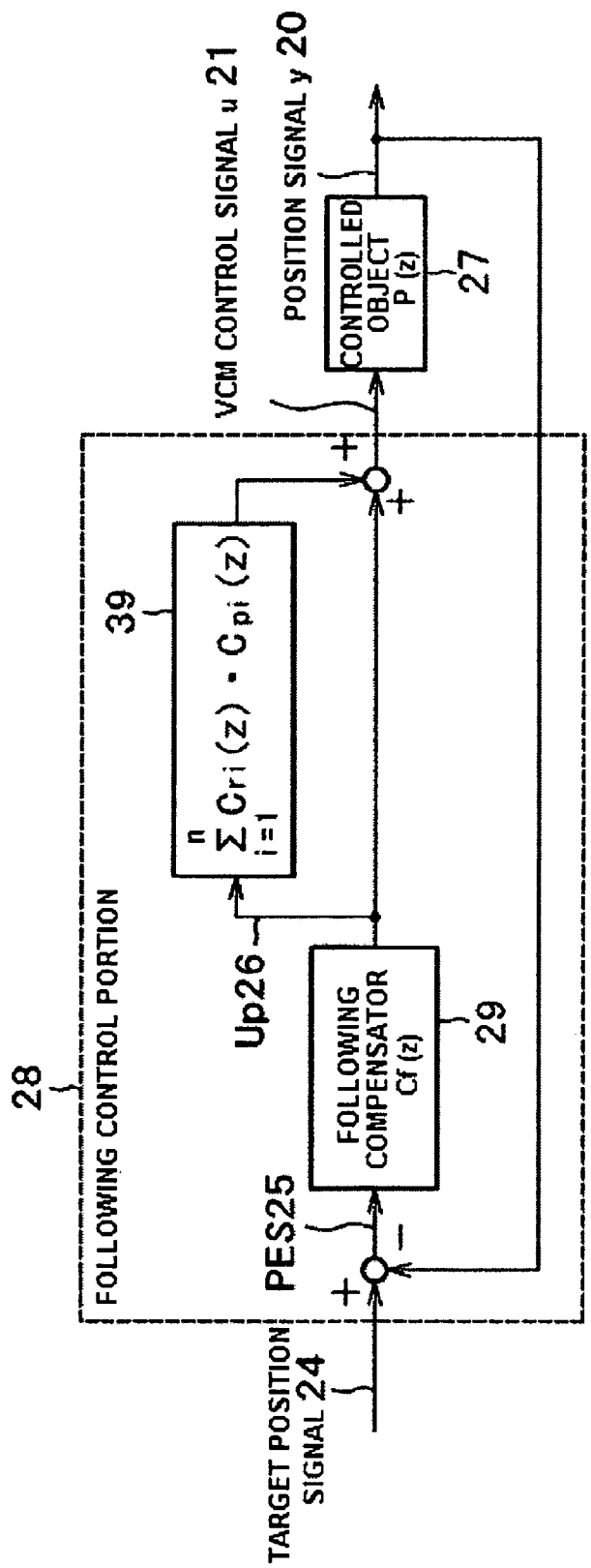
FIG. 14 is a block diagram of the positioning control system of a magnetic disk drive of a third embodiment of the present invention.
Figure 15:
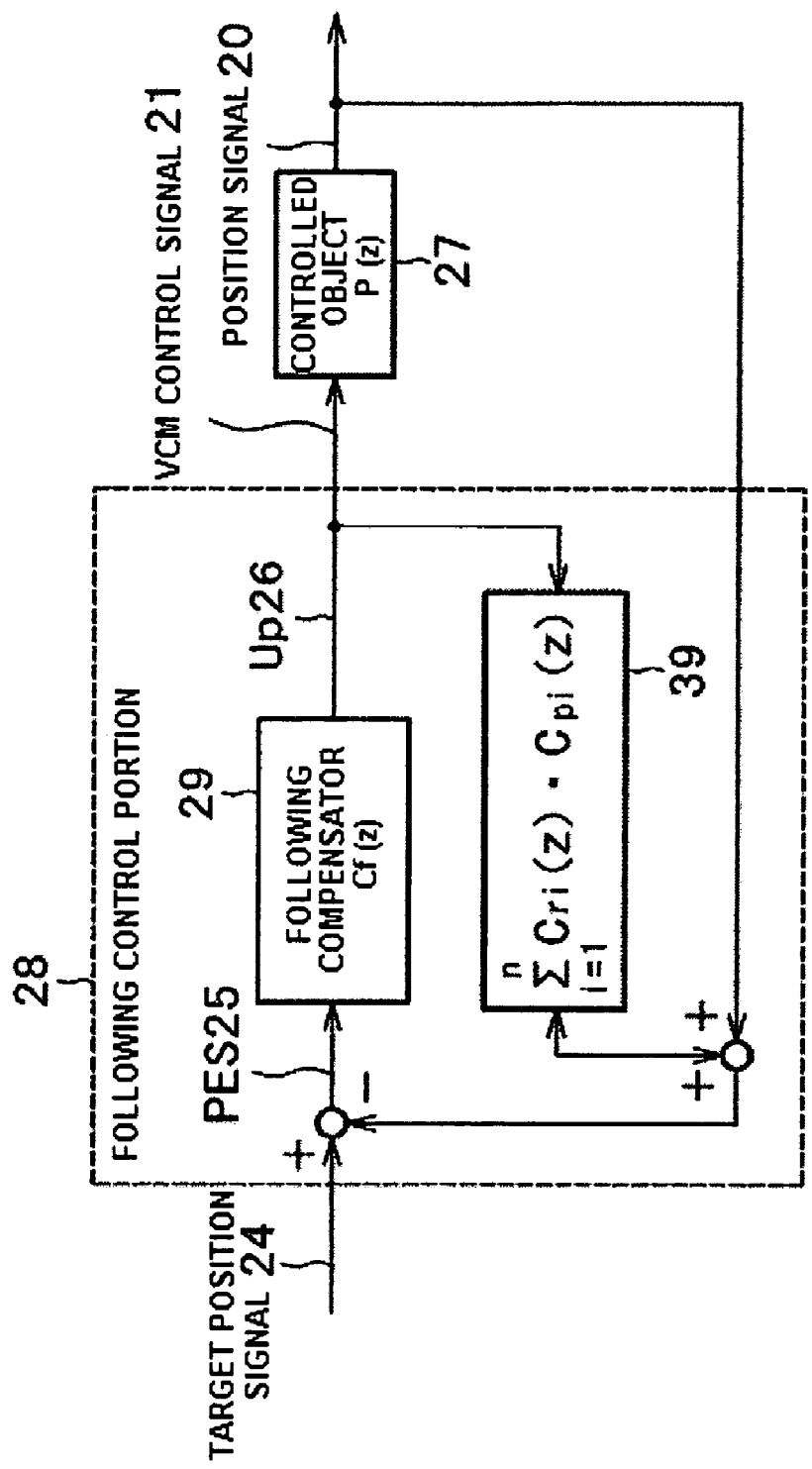
FIG. 15 is a block diagram of the positioning control system of a magnetic disk drive of a fourth embodiment of the present invention.

While some of the embodiments of the present invention have been described in detail so far, one resonator filter and one modal phase filter are used therein. However, it is also possible to pluralize them. Let Crn(z) be the nth resonant filter. Let Cpn(z) be a modal phase filter corresponding to the Cm(z). A block diagram of a control system in a third embodiment of the present invention in a case where n resonant filters and modal phase filters are applied to the first embodiment is as shown in FIG. 14. In FIG. 14, the transfer characteristic of a resonant modal phase filter 39 consisting of n resonant filters and modal phase filters is given by the formula (Mathematical Formula 10). Furthermore, a block diagram of a control system in a fourth embodiment of the present invention in a case where n resonant filters and modal phase filters are applied to the second embodiment is as shown in FIG. 15. In FIG. 15, the transfer characteristic of a resonant modal phase filter 39 consisting of n resonant filters and modal phase filters is given by the formula (Mathematical Formula 10). According to the third and fourth embodiments, the sensitivity function at a local frequency at which an external disturbance exists can be improved further.

[Mathematical Formula 10]

$$\sum_{i=1}^{n} Cn(Z) \cdot Cpi(Z) \qquad \text{(Mathematical Formula 10)}$$

Furthermore, in the aforementioned first embodiment, the mechanical system model Ps(s) of the controlled object 27 is used in designing the resonant filter 30. However, where the mechanical system characteristics of the controlled object 27 have complex characteristics, there is the anxiety that the order of the resonant filter 30 increases. In addition, there is the problem that the resonant filter 30 becomes unstable when the mechanical system characteristics of the controlled object 27 have an unstable zero point. This problem can be circumvented by reducing the dimensionality of the mechanical system model Ps(s) used in designing the resonant filter. The mechanical system model Ps(s) used in designing the resonant filter 30 is only required that the mechanical system characteristics of the controlled object 27 can be reproduced only around the resonant frequency of the resonant mode Fr(s) without using any unstable zero point. At this time, Fr(s)/Ps(s) must be an appropriate transfer characteristic. For instance, where the phase of the mechanical system characteristics of the controlled object 27 near the resonant frequency of the resonant mode Fr(s) is −180°×n (n is an integer), the mechanical system model Ps used to design the resonant filter 30 is given by a constant Kp or a formula (Mathematical Formula 11). The constant Kp may be so selected that the mechanical system model Ps and the mechanical system characteristics of the controlled object 27 are coincident in gain near the resonant frequency of the resonant mode Fr(s).

[Mathematical Formula 11]

$$\frac{Kp}{S^2} \qquad \text{(Mathematical Formula 11)}$$

Furthermore, in the first embodiment, the phase is adjusted using the modal phase filter 31. A similar phase adjustment may also be made by the mechanical system model Ps(s) used in designing the resonant filter 30 without using the modal phase filter 31. Let Dfr [rad] be the phase of the resonant mode Fr(s) at the frequency ωnv. Let Dop [rad] be the phase of the open-loop transfer characteristic at the frequency ωnv. At this time, if the phase Dps [rad] of the mechanical system model Ps(s) used in designing the resonant filter at the frequency ωnv becomes Dfr+Dop−Drm, the vector locus of the control system can be made to assume a trajectory going away from the coordinates (−1, 0) of the unstable point at the frequency of the resonant mode.

In addition, in the second embodiment, the output from the modal phase filter 31 is added to the position signal 20 as shown in FIG. 11. The output from the resonant filter 31 may be subtracted from the error signal PES 25.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic disk drive comprising:
    a magnetic disk that records information;
    a magnetic head that records information on said magnetic disk or plays back the information on said magnetic disk;
    an actuator that drives said magnetic head; and
    a control portion that creates a control signal for controlling said magnetic head such that the magnetic head assumes a target position, based on a given target position signal and on a position signal played back by said magnetic head, the control portion controlling an object to be controlled including said magnetic head and said actuator;
    wherein said control portion is configured such that (i) a resonant characteristic is present in open-loop transfer characteristics when said control portion and said controlled object are connected, at a frequency other than a mechanical resonant frequency of the controlled object, (ii) a frequency of said resonant characteristic is higher than a frequency at which a gain characteristic of said open-loop transfer characteristics becomes 0 dB, and (iii) a phase of said open-loop transfer characteristics at the frequency of said resonant characteristic becomes arctangent ((Rop+1)/Iop) when coordinates of a vector locus of said open-loop transfer characteristics are (Rop, Iop) at the frequency of said resonant characteristic.

2. A magnetic disk drive as set forth in claim 1, wherein a vector locus obtained by representing on a Nyquist diagram the open-loop transfer characteristics when said control portion and said controlled object are connected has such characteristics as to create a dextrorotatory circular locus in a direction going away from coordinates (−1, 0) of an unstable point on the Nyquist diagram with increasing the frequency near a frequency at which positioning accuracy should be improved.

3. A magnetic disk drive comprising:
    a magnetic disk that records information;
    a magnetic head that records information on said magnetic disk or plays back the information on said magnetic disk;
    an actuator that drives said magnetic head; and
    a control portion that creates a control signal for controlling said magnetic head such that the magnetic head assumes a target position, based on a given target position signal and on a position signal played back by said magnetic head, the control portion controlling an object to be controlled consisting of said magnetic head and said actuator;
    wherein said control portion is configured such that a phase of open-loop transfer characteristics at the frequency of a resonant characteristic becomes arctangent ((Rop+1)/Iop) when coordinates of a vector locus of said open-loop transfer characteristics are (Rop, Iop) at the frequency of said resonant characteristic;
    wherein the control portion comprises
    (a) a compensator that accepts an error signal as an input, the error signal being based on the given target position signal and on the position signal played back by said magnetic head, the compensator creating a control signal to make a phase compensation so as to stabilize a mechanical resonant mode existing in said controlled object,
    (b) a resonant filter accepting the control signal created by said compensator as an input, the filter having a resonant characteristic at or near a frequency at which given positioning accuracy should be improved, and
    (c) a modal phase filter that operates phase characteristics of said resonant filter.

4. A magnetic disk drive as set forth in claim 3, wherein said control portion has (i) an error detection portion which takes out the difference between said given target position signal and the position signal played back by said magnetic head as an error signal and which outputs the error signal to said compensator and (ii) an adder that sums up the control signal created by said modal phase filter and the control signal created by said compensator and outputs the sum signal to said controlled object as a control signal.

5. A magnetic disk drive as set forth in claim 3, wherein said control portion has (i) an adder portion that sums up the control signal created by said modal phase filter and the position signal played back by said magnetic head and (ii) an error detection portion that takes out the difference between said given target position signal and the position signal created by said adder portion as an error signal and outputs said error signal to said compensator.

6. A magnetic disk drive as set forth in claim 5, wherein a vector locus obtained by representing on a Nyquist diagram the open-loop transfer characteristics when said control portion and said controlled object are connected has such characteristics as to create a dextrorotatory circular locus in a direction going away from coordinates (−1, 0) of an unstable point on the Nyquist diagram with increasing the frequency near a frequency at which positioning accuracy should be improved.

7. A magnetic disk drive as set forth in claim 5, wherein said control portion has a plurality of resonant filters and a plurality of modal phase filters.

8. A magnetic disk drive as set forth in claim 4, wherein a vector locus obtained by representing on a Nyquist diagram the open-loop transfer characteristics when said control portion and said controlled object are connected has such characteristics as to create a dextrorotatory circular locus in a direction going away from coordinates (−1, 0) of an unstable point on the Nyquist diagram with increasing the frequency near a frequency at which positioning accuracy should be improved.

9. A magnetic disk drive as set forth in claim 4, wherein said control portion has a plurality of resonant filters and a plurality of modal phase filters.

10. A magnetic disk drive as set forth in claim 3, wherein a vector locus obtained by representing on a Nyquist diagram the open-loop transfer characteristics when said control portion and said controlled object are connected has such characteristics as to create a dextrorotatory circular locus in a direction going away from coordinates (−1, 0) of an unstable point on the Nyquist diagram with increasing the frequency near a frequency at which positioning accuracy should be improved.

11. A magnetic disk drive as set forth in claim 3, wherein said control portion has a plurality of resonant filters and a plurality of modal phase filters.

\* \* \* \* \*